United States Patent [19]

Hibi et al.

[11] Patent Number: 5,064,298
[45] Date of Patent: Nov. 12, 1991

[54] MACHINE PARTS HAVING MINUTE RANDOM RECESSES

[75] Inventors: Kenji Hibi, Yoro; Toshihide Goto, Morimachi, both of Japan

[73] Assignee: NTN Corporation, Osaka, Japan

[21] Appl. No.: 619,587

[22] Filed: Nov. 29, 1990

[30] Foreign Application Priority Data

Nov. 30, 1989 [JP] Japan .................................. 1-314050

[51] Int. Cl.$^5$ ........................ F16C 33/12; F16C 33/64
[52] U.S. Cl. .................................. 384/625; 384/420; 384/450; 384/492; 384/565
[58] Field of Search ............... 384/450, 492, 565, 625, 384/420, 424, 322, 368

[56] References Cited

U.S. PATENT DOCUMENTS

| | | | |
|---|---|---|---|
| 2,433,457 | 12/1947 | Jarrett et al. | 384/625 |
| 4,776,237 | 10/1988 | Premiski et al. | 384/420 X |
| 4,893,387 | 1/1990 | Akamatsu et al. | 29/121.1 |
| 4,973,068 | 11/1990 | Lebeck | 384/625 X |

FOREIGN PATENT DOCUMENTS 220720  9/1989  Japan .................................. 384/492

*Primary Examiner*—Thomas R. Hannon
*Attorney, Agent, or Firm*—Armstrong, Nikaido, Marmelstein, Kubovcik & Murray

[57] ABSTRACT

A machine part having a rolling or sliding surface formed with a plurality of minute recesses at random with the SK value less than zero in both the longitudinal and circumferential directions, and the area ratio of the recesses to the whole rolling surface being 10–40 percent.

5 Claims, 5 Drawing Sheets

EXAMPLE OF MEASUREMENT OF SURFACE ROUGHNESS (IN THE AXIAL DIRECTION)

×1000
×100

×1000
×100

EXAMPLE OF MEASUREMENT OF SURFACE ROUGHNESS (IN THE CIRCUMFERENTIAL DIRECTION)

EXAMPLE OF MEASUREMENT OF SURFACE ROUGHNESS (IN THE AXIAL DIRECTION)

EXAMPLE OF MEASUREMENT OF SURFACE ROUGHNESS (IN THE CIRCUMFERENTIAL DIRECTION)

EXAMPLE OF MEASUREMENT OF SURFACE ROUGHNESS

MACHINE PARTS HAVING MINUTE RANDOM RECESSES

The present invention relates to machine parts, such as a rolling bearing, which have a rolling surface and which exhibit a long life irrespective of whether the mating surface is a rough surface or a well-finished smooth surface.

This invention also relates to a machine part having a sliding surface adapted to make a sliding contact while bearing a thrust load, and more specifically a machine part such as a thrust washer in a pinion gear unit of an epicycle reduction gear mounted in an automobile or the like, a thrust washer mounted in a transmission, and a rotary member having a flange for positioning it in a thrust direction, such as a roller follower and a cam follower.

It is well-known that the surface roughness of its rolling surface is one of the important factors affecting the rolling fatigue life of a rolling element and inner and outer rings in a rolling bearing. It has heretofore been believed that the smoother the finished rolling surface, the longer the rolling fatigue life will be. But after repeated trials and errors it was found that a rolling element does not necessarily have to have a smooth and well-finished surface for long life.

Such a rolling element has on a rolling surface a rough surface formed with scratches extending in random directions and having a maximum roughness of 0.3–0.8 micron. This rolling element turned out to have a rather long life. But if the mating surface is a well-finished surface, the formation of an oil film layer between the contact surfaces is not sufficient. This might cause the wear or peeling of the shaft. Thus, this rolling element cannot be used with a shaft having such a well-finished contact surface.

FIG. 17 shows a thrust washer used in a pinion gear unit of an epicycle reduction gear. A gear 43 is rotatably mounted on a pin 41 through needle bearings 42. Support rings 44 are fixed on the outer periphery of the pin 41 at both sides of the gear 43. Thrust washers 45 are mounted between the support rings 44 and the gear 43.

The thrust washers 45 are formed on both sides thereof with sliding surfaces adapted to come into sliding contact with the gear 43 and the support rings 44 while bearing a thrust load. Therefore, a high antiseize property is required for such thrust washers.

Therefore, as shown in FIG. 18, there is used a thrust washer 45 formed in the slide surfaces thereof with radial grooves 46 to facilitate flow of lubricant onto the sliding surfaces.

Also, in order to prevent seizure, improvements in the materials for thrust washers have also been made. For example, for a thrust washer, a soft material such as copper is adopted.

But with a thrust washer formed in its sliding surfaces with grooves 46, if the amount of lubricant is small, lubrication will be poor at portions remote from the grooves 46. This may result in partial seizure. In other words, this arrangement cannot prevent seizure effectively.

If the number of grooves 46 is increased, the contact area will reduce, thus reducing the permissible thrust load. Thus this solution is not practical.

Further, a thrust washer made of a soft material has a disadvantage that the permissible surface pressure is low. Thus such a thrust washer is not practical, either.

It is an object of the present invention to provide a rolling element for a rolling bearing which allows an oil film to be formed easily and which exhibits a long life irrespective of whether it is used in contact with a rough surface or a smooth surface.

It is another object of this invention to provide a machine part which allows a sufficient formation of oil film on the sliding surfaces adapted to make a sliding contact while bearing a thrust load, which can prevent seizure by improving lubricity, and which can improve the durability and increase the permissible thrust load.

The rolling element according to the present invention has its surface formed with a plurality of minute recesses formed at random. The values SK are set to below zero both in the longitudinal and circumferential directions. Also, the area ratio of the recesses to the whole surface is 10–40 percent. This increases the oil film formation ratio and the mating surface is kept free from peeling and wear irrespective of its surface roughness. Thus its life is long.

In the sliding surfaces of the machine part adapted to make sliding contact while bearing a thrust load, a plurality of independent minute recesses are formed in random directions. The recesses have an average area of 35–150 square microns each and account for 10–40 percent of the entire surface area. Thus, the oil film formation ratio will improve, preventing temperature rise and thus seizure. As a result the life of the machine part will increase.

The minute recesses formed at random facilitate the formation of oil film. They also serve as oil sumps, making more reliable oil film formation on the sliding surfaces. This reduces the torque during rotation. Since oil film can be formed on the sliding surfaces efficiently and reliably, the machine part exhibits an increased resistance to seizure, and the torque and temperature rise can be reduced. By the reduction in torque and improvement in the resistance to seizure, a hard material can be used. Thus the machine part can withstand a higher surface pressure. This leads to an improvement in the threshold PV value.

Other features and objects of the present invention will become apparent from the following description taken with reference to the accompanying drawings, in which.

Figure 5:
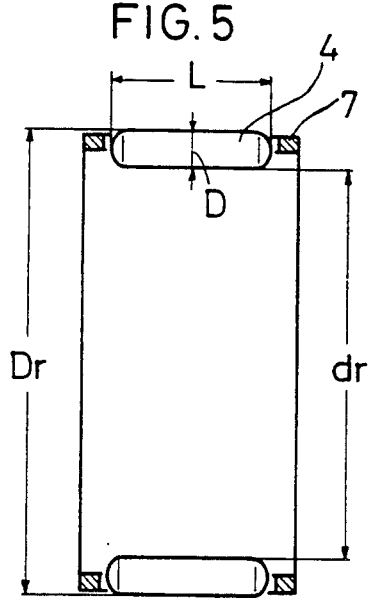
Figure 6:
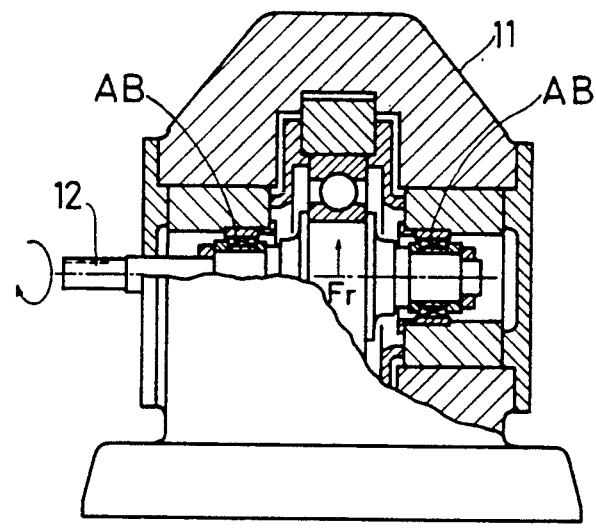
Figure 7:
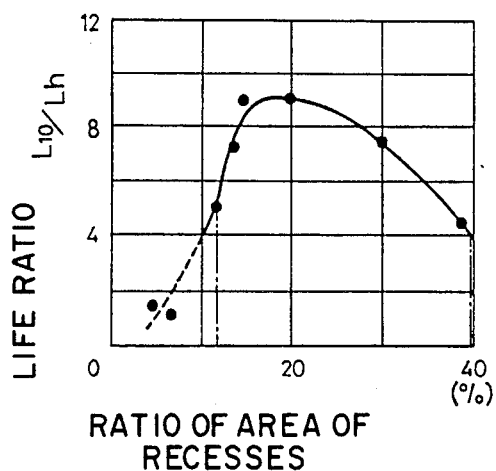
Figure 8:
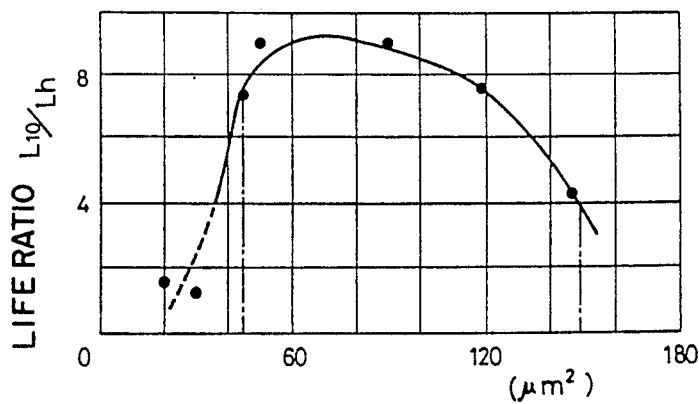
Figure 14:
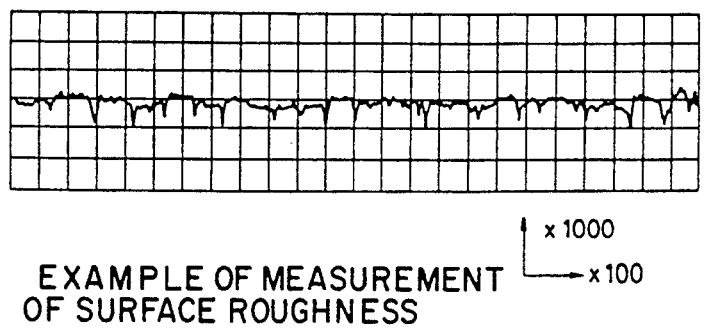
Figure 15:
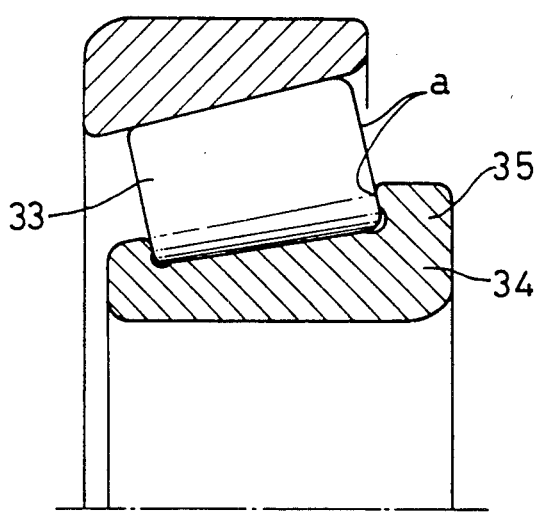
Figure 16A:
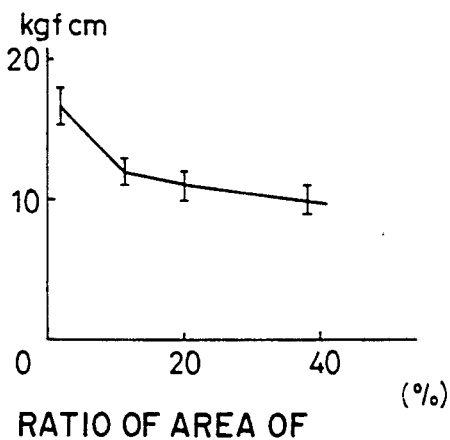
Figure 16B:
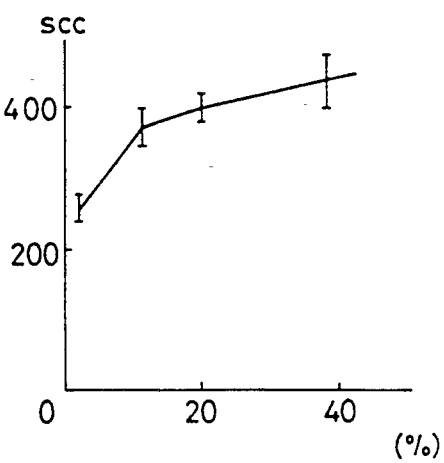
Figure 17:
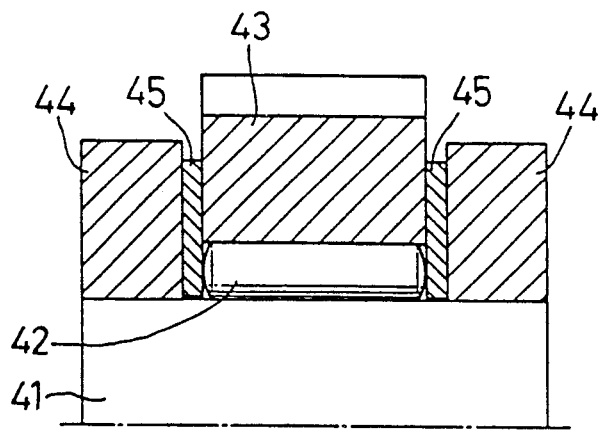

FIGS. 3(A) and 3(B) and 4(A) and 4(B) are graphs showing the surface roughness of the rolling elements tested;

FIG. 5 is a sectional view of a needle bearing used in the life tests;

FIG. 6 is a schematic view of a life testing device;

FIGS. 7 and 8 are graphs showing the results of the life tests;

FIGS. 9–13 are sectional views of other embodiments of the present invention;

FIG. 14 is a graph showing the surface roughness of the sliding surfaces of the machine part;

FIG. 15 is a sectional view of a tapered roller bearing;

FIGS. 16A and 16B are graphs showing the measurements of the area ratio of the minute recesses, the turning torque of the bearing and the resistance to seizure;

FIG. 17 is a vertical sectional view of a prior art machine part; and

Figure 18:
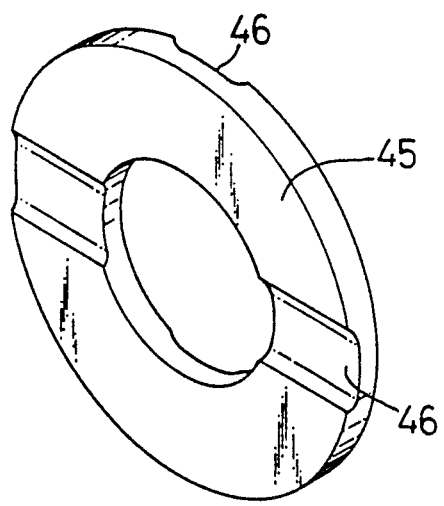

FIG. 18 is a perspective view of a prior art thrust washer.

Figure 1:
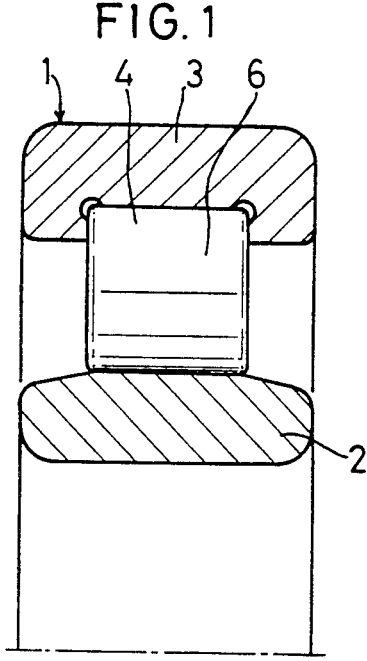
FIG. 1 is a sectional view of the first example of a rolling bearing.

FIG. 1 shows, as the first example of a rolling bearing 1, a cylindrical roller bearing having cylindrical rolling elements 4 mounted between an inner ring 2 and an outer ring 3.

Figure 2:
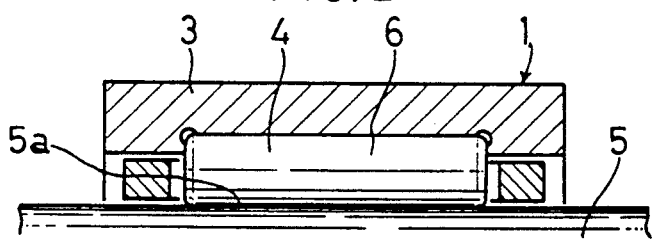
FIG. 2 is a sectional view of the second example of a rolling bearing.
Figure 3A:
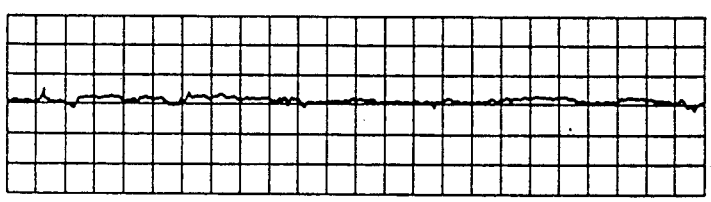
Figure 3B:
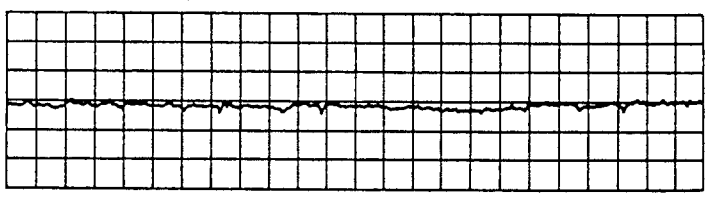
Figure 4A:
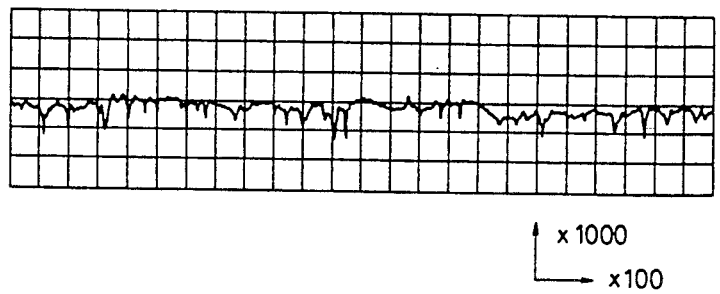
Figure 4B:
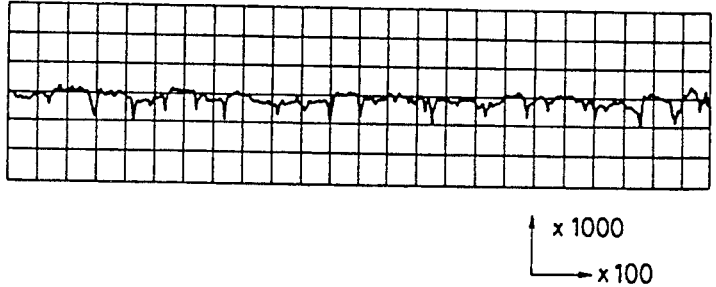

FIG. 2 shows, as the second example of a rolling bearing 1, a needle bearing 1 having cylindrical rolling elements 4 mounted in an outer ring 3 to support a shaft 5. In the second example, the shaft 5 corresponds to the inner ring 2 in the first example and the outer peripheral surface of the shaft 5 serves as a rolling surface 5a.

In each example of the rolling bearing 1, the surface of the rolling element 4 or the rolling surface of at least one of the inner ring 2, outer ring 3 and shaft 5 has a rough surface 6 formed with minute recesses arranged in random directions. The rough surface should have a roughness determined so that the ratio RMS(L)/RMS(C) will be not more than 1.0, e.g. 0.7 to 1.0, wherein RMS(L) and RMS(C) represent the root mean square roughness of the rolling surface in the longitudinal and circumferencial directions, respectively. The SK value, which is another parameter of surface roughness, should be less than zero in both the longitudinal and circumferencial directions.

The rolling surface having such a roughness as defined above can be formed by special barreling.

The SK values represent the skewness of the curve showing the distribution of the surface roughness. If the roughness distribution forms a symmetrical curve as with a Gauss distibution curve, the SK value will be zero. It has been found out that an oil film layer can be more easily formed if the SK values for both the longitudinal and circumferential directions are set to less than zero.

The total area of the minute recesses should be 10 to 40 per cent of the whole surface area of the rolling surface. The average area of the minute recesses should be 35 to 150 square microns, calculated with small recesses having an equivalent diameter of 3 microns or less excluded.

FIG. 3 shows the condition of finished surface of a standard bearing and FIG. 4 shows that of the rolling element according to the present invention.

A quantitative measurement of minute recesses can be made by enlarging the rolling surface on a rolling element and analyzing the enlarged image by use of a commercially available image analyzing system.

The white portions and the black ones are determined as the flat portions and the minute recesses, respectively. In analyzing by use of an image analyzing system, the light and shade of the original image are exaggerated by use of a exaggerating filter and very minute black dots with a diameter of 3 microns or less are erased by use of a noise eraser. The remaining minute recesses even after erasing are then checked for size and distribution and the ratio of the area of the minute recesses to the whole surface area is determined to evaluate the rolling surface of the rolling element and the inner and outer rings.

The rolling elements of the needle roller bearing were treated to form in their surface minute recesses with different area ratios with respect to the whole surface area, different average areas, and different average equivalent diameters. These rolling elements were tested under radial load for durability.

The needle bearing used for the tests has fourteen rolling elements 4 held in a cage 7 and has an outer diameter (Dr) of 38 mm, an inner diameter (dr) of 28 mm, a diameter (D) of the rolling element 4 of 5 mm and a length (L) of 13 mm, as shown in FIG. 5.

The life testing device used was a radial load tester 11 as shown in FIG. 6. The bearings to be tested were mounted at both ends of a rotary shaft 12 and tested giving rotation under load.

The inner race (or mating shaft) used in the test had a surface finished by grinding to Rmax of 0.4-4 microns. The outer race used had a surface finished by grinding to Rmax of 1.6 microns.

Test conditions were as follows.
Radial load—1,465 kg f
Number of revolutions—3050 rpm
Lubricant—turbine oil The graph of FIG. 7 shows the relationship between the area ratio and the life and the graph of FIG. 8 shows the relationship between the average area and the life.

These graphs show that the ratio of the durability life ($L_{10}$) to the calculated life (Lh) is over four when the area ratio is not less than 10 per cent and the average area is not less than 35 square microns. Namely, the minute recesses are effective for longer life when the area ratio and the average area are not less than these values.

Although the abovesaid tests were conducted on the rolling element of a needle bearing formed with minute recesses, similar effects on the durability were confirmed on rolling bearings whose inner or outer rings and rolling surface were formed with minute recesses.

If the area ratio is more than 30 percent and the average area is more than 120 square microns, the effective contact length would decrease and the effect of minute recesses on the life would decrease.

With reference to FIGS. 9-13, the machine parts according to the present invention have sliding surfaces adapted to make sliding contact while bearing a thrust load. FIGS. 9-13 show specific examples of the machine parts.

Figure 9:
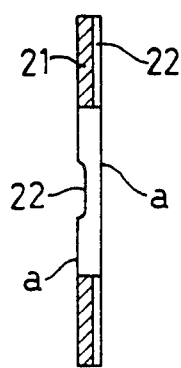
Figure 10:
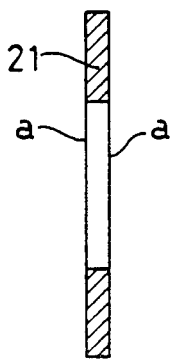

FIGS. 9 and 10 show thrust washers 21 adapted to be mounted on a pinion gear unit in an epicycle reduction gear of an automobile shown in FIG. 17.

As shown in FIG. 9, grooves 22 may be formed in the sliding surfaces at both sides of the machine part. Otherwise, as shown in FIG. 10, the sliding surfaces may be flat.

Figure 11:
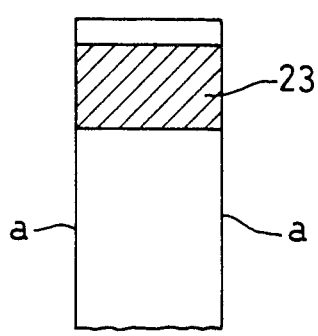

FIG. 11 shows a gear 23 which is also used in an epicycle reduction gear. Both side surfaces thereof serve as sliding surfaces.

Figure 12:
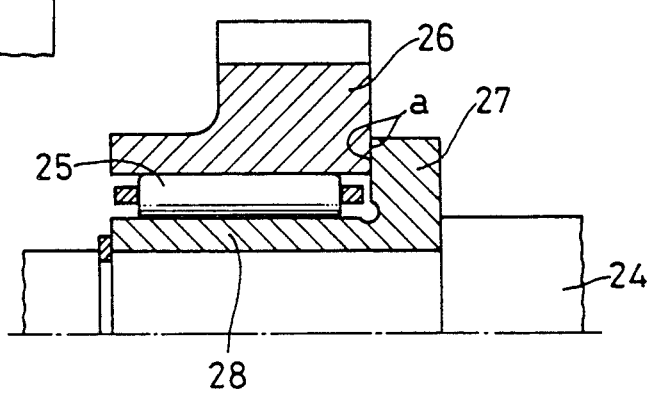

FIG. 12 shows a gear-mounting structure in a transmission. In order to mount a gear 26 on a shaft 24 through roller bearings 25, a rotary member 28 having at one end thereof a flange 27 for positioning the gear 26 in a thrust direction is fixedly mounted on the shaft 24. The inner surface of the flange 27 of the rotary member 28 and the end face of the gear 26 serve as sliding surfaces.

Figure 13:
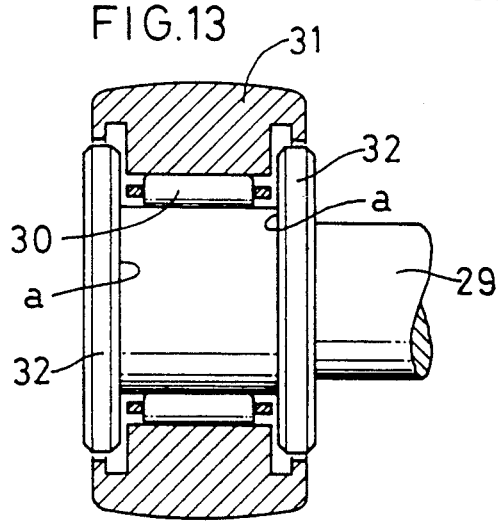

FIG. 13 shows a cam follower assembly. A cam follower 31 is rotatably mounted on a shaft 29 through bearings 30. Flanges 32 are provided around the shaft 29 so as to dispose at both sides of the cam follower 31 to position it in a thrust direction. Both sides of the cam follower 31 and the sides of the flanges 32 serve as sliding surfaces.

The above-described machine parts are made of a hard material and are formed by special barelling in the sliding surfaces thereof with a multitude of independent minute recesses in random directions to form rough surfaces a.

FIG. 14 is a graph showing the roughness of the rough surfaces a. As shown in this figure, the rough surfaces are formed with recesses but no protrusion is formed on their plane.

Each of the minute recesses in the rough surfaces a has an average area of 35-150 square microns. The total area of the recesses should account for 10-40 percent of the whole surface area.

The rough surfaces have an average Rmax value of 0.6-2.5 microns and a SK value (which is a parameter of the surface roughness) of not more than −1.6.

The parameter SK value should be within a range where the recesses are shaped and distributed so that oil film can be formed most efficiently. During sliding contact or rolling contact, the recesses serve as oil sumps to supply oil to the contact portion.

It is known that the PV value (P: contact surface pressure, V: sliding velocity) is especially large when, in a tapered roller bearing as shown in FIG. 15, the large-diameter ends of the tapered rollers 33 are in sliding contact with a large-diameter flange 35 of the inner ring 34. Thus, we used tapered roller bearings to measure the sliding frictional resistance and the resistance to seizure of the rough surfaces.

Each of the bearings used had an outer ring 72 mm in external diameter and an inner ring 30 mm in internal diameter. Minute recesses were formed in the respective roller surfaces with different area ratios and comparison tests were conducted.

The sliding frictional resistance at the sliding portion was given in terms of the turning torque of the bearing. The antiseizure property was given in terms of the time until seizure happens with lubricant applied in an extremely small quantity. The results are shown in FIGS. 16A and 16B.

As will be apparent from these figures, when the area ratio of the recesses to the entire surface is 10 percent or more, the recesses can have a favorable effect on the frictional resistance and the resistance to seizure.

Further, in case of a machine part in which a sliding contact portion and a rolling surface of a roller bearing are located close to each other, as shown in FIG. 12, when subjecting only the sliding surface to a special surface treatment, special means such as masking is required. This leads to increase in the cost. Thus, it is preferable that such a special surface treatment can e tend the life of the machine part.

Now, let us describe the effects of the rough surfaces while in rolling contact.

The bearing used for this test was a needle bearing as shown in FIG. 5. Rollers 4 formed on the surfaces thereof with minute recesses in different area ratios and in different average areas were prepared and subjected to a life test under a radial load. The life tester shown in FIG. 6 was used.

The inner races used in this test were ground to Rmax of 2 microns. The outer races were finished to a roughness Rmax of 1.6 microns.

Other testing conditions were as follows:
Radial load on bearing—1465 kgf
Number of revolutions of shaft—3050 rpm
Lubricant—turbine oil The results of the life test are as shown in FIGS. 7 and 8.

FIG. 7 shows the relation between the area ratio of the minute recesses and FIG. 8 shows the relation between the average area of minute recess and the durability.

It will be apparent from the test results that life tends to be long if the area ratio is 10 percent or more and the average area is 35 square microns or more.

On the other hand, even if the area ratio is 40 percent or more and the average area is 150 square microns or more, longer life cannot be expected because the effective contact area decreases.

Special surface treatment should be done so as to satisfy all of the sliding frictional resistance, the antiseizure property and the rolling fatigue life.

What is claimed is:

1. A machine part having a rolling surface adapted to make a rolling contact, said rolling surface being formed with a plurality of minute recesses at random, a SK value being less than zero both in the longitudinal and circumferential directions, and the area ratio of said recesses to the whole rolling surface being 10-40 percent, said SK value representing skewness of a distribution curve showing surface roughness in the longitudinal and circumferential directions.

2. A machine part as claimed in claim 1, wherein said machine part is a rolling bearing having an outer ring, an inner ring and rolling elements, said rolling surface being at least one of the raceway surface of said outer ring, that of said inner ring, and the rolling surface of said rolling elements.

3. A machine part having a sliding surface adapted to make a sliding contact while bearing a load, said sliding surface being formed with a plurality of minute recesses at random, a SK value being less than zero both in the longitudinal and circumferential directions, and the area ratio of said recesses to the whole sliding surfaces being 10-40 percent, said SK value representing skewness of a distribution curve showing surface roughness in the longitudinal and circumferential directions.

4. A machine part as claimed in claim 3, wherein said machine part is a rolling bearing having an outer ring, an inner ring and rolling elements, said sliding surface being at least one of the rib of said rolling bearing and the end surface of rolling elements.

5. A machine part as claimed in any of claim 1-4, wherein the average area of said recesses is 35-150 square microns excluding recesses having an equivalent diameter of not more than 3 microns.

* * * * *